United States Patent
Matsumura

(10) Patent No.: US 6,799,617 B2
(45) Date of Patent: Oct. 5, 2004

(54) ROUGH TERRAIN TIRE

(75) Inventor: Sadahiko Matsumura, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 128 days.

(21) Appl. No.: 10/231,201

(22) Filed: Aug. 30, 2002

(65) Prior Publication Data
US 2003/0047261 A1 Mar. 13, 2003

(51) Int. Cl.$^7$ .................... B60C 11/11; B60C 107/00; B60C 113/00; B60C 121/00
(52) U.S. Cl. .................. 152/209.2; 153/209.11; 153/209.12
(58) Field of Search .............. 152/209.2, 209.11, 152/209.12, 902; D12/536, 544, 571, 579

(56) References Cited

U.S. PATENT DOCUMENTS

| 3,217,776 | A |   | 11/1965 | Ellenreider et al. |            |
|-----------|---|---|---------|--------------------|------------|
| 3,951,191 | A |   | 4/1976  | Suzuki et al.      |            |
| 4,267,872 | A | * | 5/1981  | Kamiya ............ | 152/209.11 |
| 4,311,179 | A | * | 1/1982  | Hayakawa et al. .. | 152/209.11 |
| 4,617,976 | A | * | 10/1986 | Kawajiri ........... | 152/209.11 |
| 6,651,711 | B2| * | 11/2003 | Matsumura ........ | 152/209.2  |

FOREIGN PATENT DOCUMENTS

| CH | 421 735    |    | 9/1966  |
|----|------------|----|---------|
| EP | 0 324 605 A2 |  | 7/1989  |
| EP | 0 475 929 A1 |  | 3/1992  |
| JP | 02011404   |    | 1/1990  |
| JP | 2-74405    | *  | 3/1990  |
| JP | 4-293603   | *  | 10/1992 |
| JP | 6-171311   | *  | 6/1994  |

* cited by examiner

Primary Examiner—Steven D. Maki
(74) Attorney, Agent, or Firm—Birch, Stewart, Kolasch & Birch, LLP

(57) ABSTRACT

A pneumatic tire for use in rough terrain which is provided in the tread with central blocks, shoulder blocks and intermediate blocks; in the tread developed in a plane, the central blocks are arranged circumferentially of the tire at substantially constant pitch lengths P1, the intermediate blocks in each intermediate region are arranged circumferentially of the tire at substantially constant pitch lengths P2, the shoulder blocks in each shoulder region are arranged circumferentially of the tire at substantially constant pitch lengths P3; in a certain number (K) of circumferential positions, the central blocks are aligned with the intermediate blocks in the tire axial direction, the number (K) is in a range of from 6 to 32; these circumferential positions are provided circumferentially of the tire at regular intervals equal to the pitch length P1 multiplied by an integral number (n), the number (n) is in a range of from 3 to 8; and the pitch length P2 and pitch length P3 are equal to the pitch length P1 multiplied by n/(n−1) or n/(n−2).

5 Claims, 3 Drawing Sheets

ROUGH TERRAIN TIRE

The present invention relates to a pneumatic tire, more particularly to a block pattern tire for use in rough terrain having an improved block arrangement.

Motorcycle tires for use in rough terrain such as motocross tires are generally provided with block-type tread pattern whose negative ratio is over 50% for traction in soft terrain such as mud traction. In such motorcycle tires, the tread camber is very high in comparison with other kinds of tires such as passenger car tire, truck/bus tire and the like, and mud is liable to accumulate in the tread shoulder region during straight running. Therefore, when the running condition changes from straight running to cornering, due to the accumulate mud, road grip and traction are decreased, and control of the machine is liable to be lost.

It is therefore, an object of the present invention to provide a pneumatic tire for use in rough terrain, in which, by improving the arrangement of tread blocks, mud accumulation, traction and the like can be improved, and a running performance change when the running condition changes from straight running to cornering or vice versa is decreased.

According to the present invention, a pneumatic tire comprises a tread comprising central blocks, shoulder blocks and intermediate blocks,
  in the tread which is developed in a plane, the central blocks are arranged circumferentially of the tire at substantially constant pitch lengths P1, the intermediate blocks in each of the intermediate regions are arranged circumferentially of the tire at substantially constant pitch lengths P2, and the shoulder blocks in each of the shoulder regions are arranged circumferentially of the tire at substantially constant pitch lengths P3,
  in a certain number (K) of circumferential positions, the central blocks are aligned with the intermediate blocks in the tire axial direction, wherein the number (K) is in a range of from 6 to 32,
  the circumferential positions are provided circumferentially of the tire at regular intervals equal to the pitch length P1 multiplied by an integral number (n), wherein the number (n) is in a range of from 3 to 8,
  the pitch length P2 and pitch length P3 are equal to the pitch length P1 multiplied by n/(n−1) or n/(n−2),
wherein the central blocks are each defined such that at least 80% of the top face of the block is within a central region centered on tire equator and has a width of 25% of the tread width; the shoulder blocks are each defined such that at least 80% of the top face of the block is within a shoulder region extending from each of tread edges to have a width of 12.5% of the tread width; the intermediate blocks are each defined such that at least 80% of the top face of the block is within an intermediate region between the central region and each of the shoulder regions.

An embodiment of the present invention will now be described in detail in conjunction with the accompanying drawings.

Figure 1:
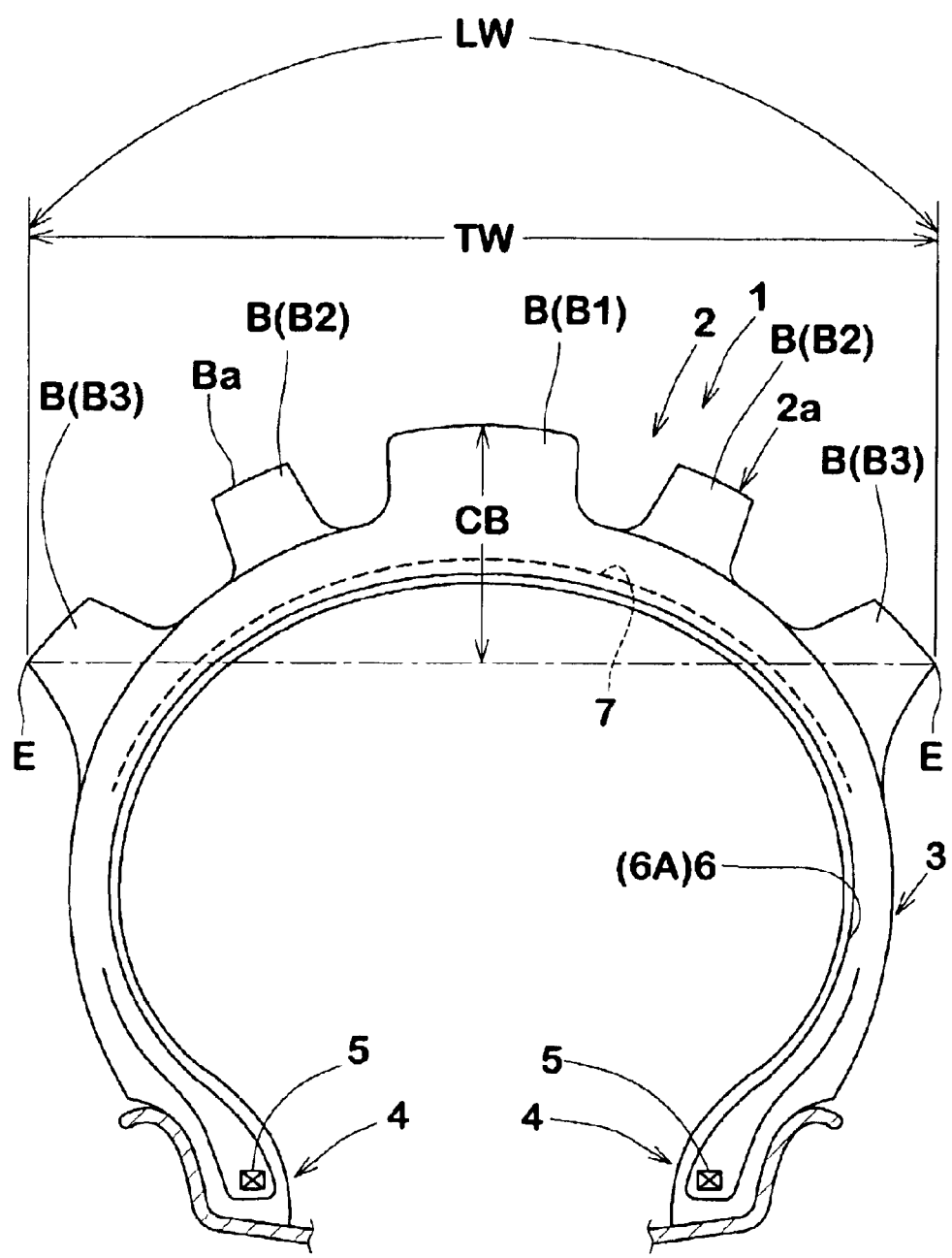
FIG. 1 is a cross sectional view of a motorcycle tire according to the present invention.

In the drawings, pneumatic tire 1 according to the present invention comprises a tread portion 2 with tread edges E, a pair of sidewall portions 3, a pair of axially spaced bead portions 4 each with a bead core 5 and a rubber bead apex 8 therein, and a carcass 6 extending between the bead portions 4.

In this embodiment, the tire 1 is a motorcross motorcycle tire whose tread portion 2 is curved so that the maximum tire width TW lies between the tread edges E. The tread camber is in a range of 0.2 to 0.45, usually in a range of 0.25 to 0.35 (in this example about 0.26). Here, the tread camber is the ratio (CB/TW) between an axial distance (=TW) between the tread edges E and a radial height (CW) of the tread crown at the tire equator measured from a line passing through the tread edges E.

The carcass 6 in this example has a bias structure comprising two or three plies of cords rubberized with topping rubber, including at least two cross plies 6A. Each ply 6A extends between the bead portions 4 and is turned up around the bead core 5 in each of the bead portions 4 from the inside to the outside of the tire and then extends radially outwardly on the axially outside of the bead core 5 and bead apex 8 so as to form a pair of turnup portions and a main portion therebetween. The cords in each of the cross plies 6A are inclined at an angle in a range of from 75 to 45 degrees with respect to the tire equator. Numerically, the cord angle of one ply 6A is substantially the same as the cord angle of the other ply 6A, but their inclining directions are opposite to each other with respect to the tire equator. For the carcass cords, organic fiber cords, e.g. nylon, polyester, rayon, aromatic polyamide and the like can be used.

In this example, in order to reinforce the under tread, a breaker 7 is disposed radially outside the carcass 6. The breaker 7 is composed of one or two plies of cords laid at an angle of from 15 to 45 degrees with respect to the tire equator.

The tread 2a comprises a plurality of blocks B. Preferably, the top face Ba of the block B is a polygon, and more preferably the block B has axially extending edges and circumferentially extending edges which are straight or almost straight. Thus, in this embodiment, each block B is provided with a substantially rectangular top face Ba.

Usually, the height of the blocks B is set in a range of from 6 to 18 mm. In this particular case, the height is preferably set in a range of from 13 to 18 mm.

Incidentally, in order to form a plurality of blocks B, the tread portion 2 can be provided with various kinds of tread grooves in a more distinct form such as circumferential groove and axial groove.

In any case, the land/sea ratio of the tread 2a is set in a range of from 10 to 50%. The land/sea ratio (L/S) is, as well known in the art, the ratio of the land area (ground contacting area) to the sea area (non-contacting area) of the tread 2a. To be concrete, the land area (L) is the total area of the top faces of the blocks B. The sea area (s) is equal to the overall area of the tread 2a minus the land area (L). If the land/sea ratio (L/S) is less than 10%, traction and cornering performance in hard terrain and medium terrain are liable to deteriorate. If the land/sea ratio (L/S) is more than 50%, the traction in soft terrain decreases. However, it is also possible to set the land/sea ratio according to the running conditions. If running is mainly in hard terrain, the land/sea ratio (L/S) is preferably set in a range of 22 to 50%. If running is mainly in soft terrain, the land/sea ratio is preferably set in a range of 10 to 22%. In case of medium terrain, the land/sea ratio is preferably set in a range of 20 to 24%.

Figure 2:
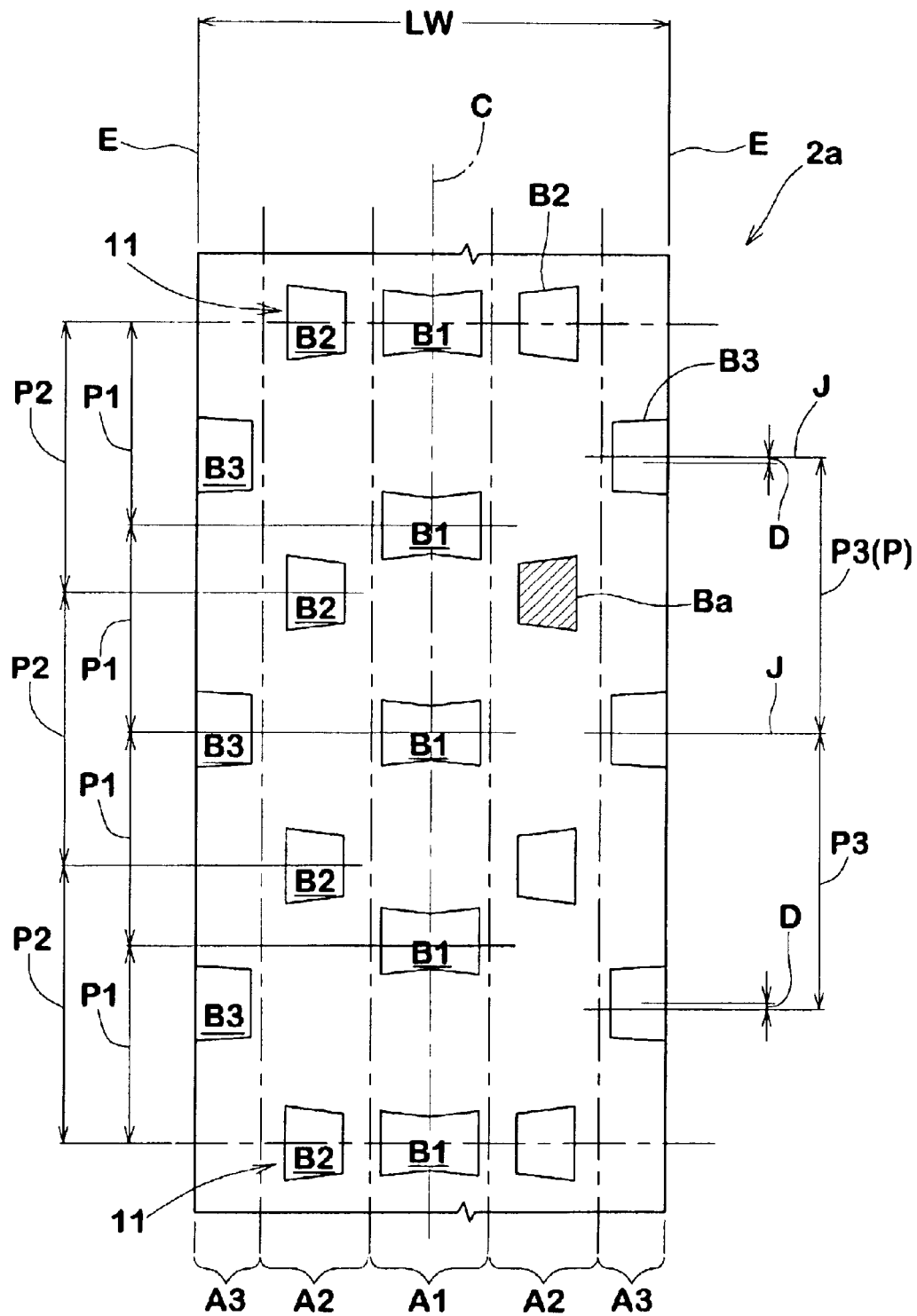
FIG. 2 is a view showing the developed tread portion thereof.

As shown in FIG. 2 which shows the tread 2a developed to a plane, the blocks B include central blocks B1, intermediate blocks B2 and shoulder blocks B3.

The central block B1 is defined such that at least 80% of the ground contacting area of the top face Ba of the block is within a central region A1 of the tread 2a. The intermediate block B2 is defined such that at least 80% of the ground contacting area of the top face Ba of the block is within an intermediate region A2 of the tread 2a. The shoulder block B3 is defined such that at least 80% of the ground contacting area of the top face Ba of the block is within a shoulder region A3 of the tread 2a. Here, the tread 2a is defined between the tread edges E, and the regions A1, A2 and A3 are defined as follows. The central region A1 is centered on the tire equator C and has a width of 25% of the tread width LW along the curved tread 2a or tread profile line. The shoulder region A3 extends from each of the tread edges E to have a width of 12.5% of the tread width LW along the curved tread 2a. The intermediate region A2 is defined as being between the central region A1 and each shoulder region A3 and accordingly having a width of 25% of the tread width LW along the curved tread 2a.

In each region (A1, A2, A3), the blocks B (B1, B2, B3) are arranged circumferentially of the tire at substantially constant pitch lengths P(P1, P2, P3) so that the position of the block B does not shift more than 8 mm in the tire circumferential direction from the regular circumferential positions J at regular intervals of constant pitch lengths P. Here, the position of the block B may be defined as that of the centroid of the block top Ba. This also means that the pitch length P can be found by dividing a circumference by a number of blocks existing in the region.

Specifically, in the central region A1, the central blocks B1 are arranged circumferentially at substantially constant pitch lengths P1. In the intermediate region A2, the intermediate blocks B2 are arranged circumferentially at substantially constant pitch lengths P2. In the shoulder region A3, the shoulder blocks B3 are arranged circumferentially at substantially constant pitch lengths P3.

According to the invention, in a certain number (K) of circumferential positions 11, the central blocks B1 and intermediate blocks B2 align with each other in the tire axial direction. Specifically, in each circumferential position 11 (hereinafter, the "aligning position" 11), one of the central blocks B1, one of the intermediate blocks B2 in one of the intermediate regions A2 and one of the intermediate blocks B2 in the other intermediate region A2 are aligned with each other in the tire axial direction.

The aligning positions 11 are provided circumferentially of the tire at regular intervals of (n) times the pitch length P1. The number (n) is an integral number in a range of from 3 to 8, preferably 4 to 6. The number (K) of the aligning positions 11 is in a range of from 6 to 32.

In the aligning position 11 in this example, the positions of the blocks B1 and B2 are exactly aligned, but it is not always necessary. Such rough alignment that the circumferential shift between the block positions are less than 8 mm may be permitted.

Further, in the developed state of the tread 2a as shown in FIG. 2, the pitch length P2 is increased such that the pitch length P2 becomes equal to the pitch length P1 multiplied by n/(n−1) or n/(n−2). In other words, between the above-mentioned aligning positions 11, the number N1 of the pitches P1 is equal to the above-mentioned number (n), and the number N2 of the pitches P2 is 1 or 2 less than the number N1.

Furthermore, the pitch length P3 is set to be equal to the pitch length P2. Accordingly, between the aligning positions 11, the number N3 of the pitches P3 is the same as the number N2. Therefore, P2=P3=P1×n/(n−1) or P1×n/(n−2)

In this example, the intermediate blocks B2 and the shoulder blocks B3 on each side of the tire equator C are staggered to provide steering stability during cornering in hard terrain. However, in order to further improve traction in soft terrain, it may be possible to align the shoulder blocks B3 with the intermediate blocks B2.

By the aligning positions 11, traction in soft terrain can be effectively improved. If the number (K) of the aligning positions 11 is less than 6, it becomes difficult to improve the traction. If the number (K) is more than 32, running performance in hard and medium terrain is liable to deteriorate although the traction in soft terrain may be improved.

If the number (n) is less than 3, then the aligning positions 11 are increased in the number (K) or the blocks B1 are increased in the size. In the former case, the running performance in hard terrain deteriorates. In the later case, the traction in soft terrain decreases. If the number (n) is more than 8, then the aligning positions 11 are decreased in the number (K) or the blocks B1 are increased in the size. In the former case, the traction in soft terrain is decreased. In the later case, as the block rigidity decreases, running performance in hard terrain deteriorates.

By setting the pitch number N2, N3 one or two smaller than the pitch number N1, the difference in the land/sea ratio between the central region A1 and intermediate region A2 and the difference in the land/sea ratio between the intermediate region A2 and shoulder region A3 can be minimized. As a result, a change in running performance from straight running to cornering can be decreased to provide steering stability. Further, mud accumulation in the sea area of the intermediate region A2 and shoulder region A3 and traction in these regions can be improved, which further improves the running performance change. If the pitch number difference N1−N2, N1−N3 is more than 2, the blocks in the intermediate region A2 and shoulder region A3 become very few, and it becomes difficult to improve the traction in soft terrain.

Comparative Test

Motocross motorcycle tires (size 110/90-19) having the basic structure shown in FIG. 1 were made and tested. In the test, a 250 cc motorcycle provided on a rear wheel with the test tire was run in a course of rough terrain including hard terrain, medium terrain and soft terrain. And the test rider evaluated mud accumulation, traction and cornering performance. The test results are shown in Table 1 using an index based on Ref. tire being 100, wherein the larger the index number, the better the performance. On the front wheel, a tire of size 90/100-20 having the tread pattern shown in FIG. 3 was mounted in common.

TABLE 1

Figure 3:
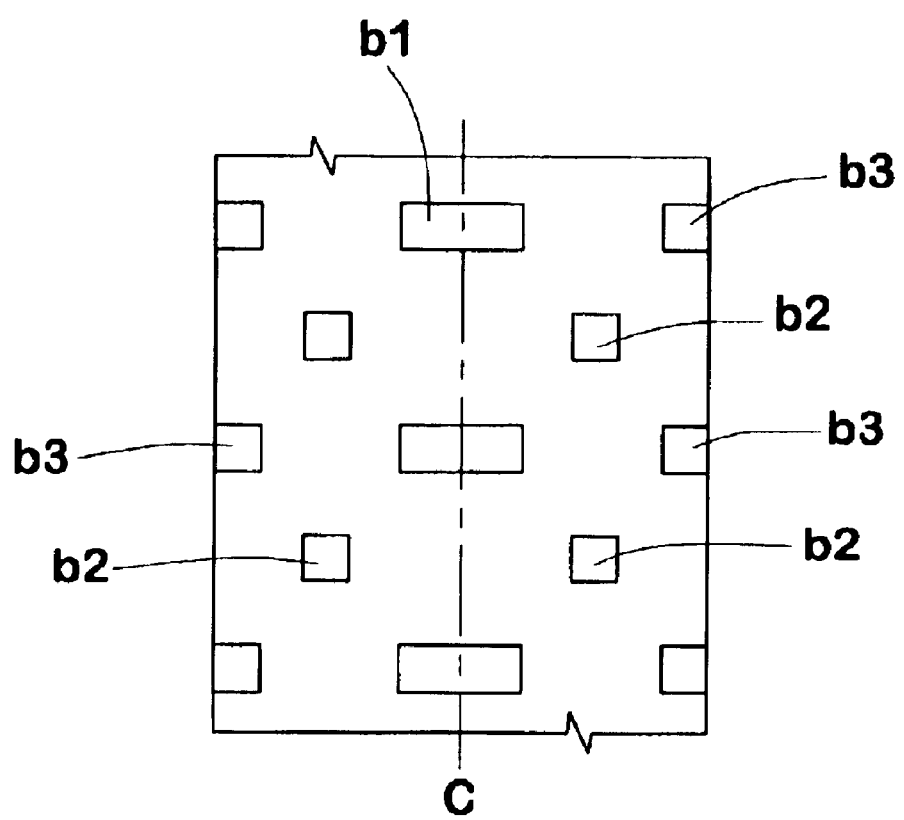
FIG. 3 is a view showing the developed tread portion of a tire used in the undermentioned comparison test.

| Tire | Ref. | Ex. 1 | Ex. 2 |
| --- | --- | --- | --- |
| Pattern | FIG. 3 | FIG. 2 | FIG. 2 |
| Block height (mm) | 17 | 17 | 17 |
| Sea/Land ratio (%) *1 | | | |
| Central region | 20 | 20 | 20 |
| Intermediate region | 20 | 15 | 16 |
| Shoulder region | 20 | 15 | 16 |
| Pitch length *1 | | | |
| P1 (mm) | 67.5 | 67.5 | 72.1 |
| P2 (mm) | 67.5 | 90.1 | 90.1 |
| P3 (mm) | 67.5 | 90.1 | 90.1 |
| Aligning position | none | | |
| Number K | 0 | 8 | 6 |
| Pitch number N1 | 4 | 4 | 5 |
| Pitch number N2 | 4 | 3 | 4 |
| Pitch number N3 | 4 | 3 | 4 |
| tire weight (%) | 100 | 90 | 95 |

TABLE 1-continued

| Tire | Ref. | Ex. 1 | Ex. 2 |
|---|---|---|---|
| Test Result | | | |
| Mud accumulation | 100 | 120 | 110 |
| Traction | 100 | 120 | 120 |
| Cornering performance | 100 | 110 | 120 |

*1 under the developed state of the tread

In the Ex.1 tire and Ex.2 tire according to the present invention, it was confirmed that the running performance change when the running condition is changed from straight running to cornering can be lessened and good cornering performance can be obtained. Further, it was also confirmed that mud accumulation and traction can be improved. Further, as the number of the shoulder blocks and intermediate blocks is decreased, a weight reduction and cost reduction are possible.

The present invention can be also applied to pneumatic tires for three or four wheeled off-road vehicles such as buggy. Further, the present invention can be applied to a radial ply tire in which the carcass cords are arranged at an angle of from 75 to 90 degrees with respect to the tire equator, and one or two belt plies 7 of cords laid at an angle of from 0 to 30 degrees with respect to the tire equator are disposed radially outside the carcass.

What is claimed is:

1. A pneumatic tire comprising a tread comprising central blocks, shoulder blocks and intermediate blocks, the central blocks each defined such that at least 80% of the top face of the block is within a central region centered on tire equator and has a width of 25% of the tread width, the shoulder blocks each defined such that at least 80% of the top face of the block is within a shoulder region extending from each of tread edges to have a width of 12.5% of the tread width, the intermediate blocks each defined such that at least 80% of the top face of the block is within an intermediate region between the central region and each of the shoulder regions, wherein in the tread developed in a plane, the central blocks are arranged circumferentially of the tire at substantially constant pitch lengths $P1$, the intermediate blocks in each of the intermediate regions are arranged circumferentially of the tire at substantially constant pitch lengths $P2$, the shoulder blocks in each of the shoulder regions are arranged circumferentially of the tire at substantially constant pitch lengths $P3$, in a certain number (K) of circumferential positions, the central blocks are aligned with the intermediate blocks in the tire axial direction, the number (K) is in a range of from 6 to 32, said circumferential positions are provided circumferentially of the tire at regular intervals equal to the pitch length $P1$ multiplied by an integral number (n), the number (n) is in a range of from 3 to 8, the pitch length $P2$ and pitch length $P3$ are equal to the pitch length $P1$ multiplied by $n/(n-1)$ or $n/(n-2)$.

2. A pneumatic tire according to claim 1, wherein the land/sea ratio of the tread is in a range of from 10 to 50%.

3. A pneumatic tire according to claim 1, wherein the tread is curved so that the maximum tire section width lies between the tread edges.

4. A pneumatic tire according to claim 2, wherein the tread is curved so that the maximum tire section width lies between the tread edges.

5. A pneumatic tire according to claim 1, wherein the blocks has a top face which is a polygon made up of substantially straight axial edges and substantially straight circumferentially edges.

\* \* \* \* \*

UNITED STATES PATENT AND TRADEMARK OFFICE
CERTIFICATE OF CORRECTION

PATENT NO. : 6,799,617 B2
DATED : October 5, 2004
INVENTOR(S) : Matsumura

It is certified that error appears in the above-identified patent and that said Letters Patent is hereby corrected as shown below:

<u>Title page,</u>
Insert Item -- [30], Foreign Application Priority Data,
      August 31, 2001      [JP]    Japan.............2001-264197 --

Signed and Sealed this

Fifteenth Day of February, 2005

JON W. DUDAS
*Director of the United States Patent and Trademark Office*